March 24, 1970 — G. F. JONAS — 3,501,793
SHOE LAST
Filed May 6, 1966 — 2 Sheets-Sheet 1

INVENTOR:
GILBERT F. JONAS
BY John N. Sutherland
ATTORNEY,

March 24, 1970 G. F. JONAS 3,501,793
SHOE LAST
Filed May 6, 1966 2 Sheets-Sheet 2
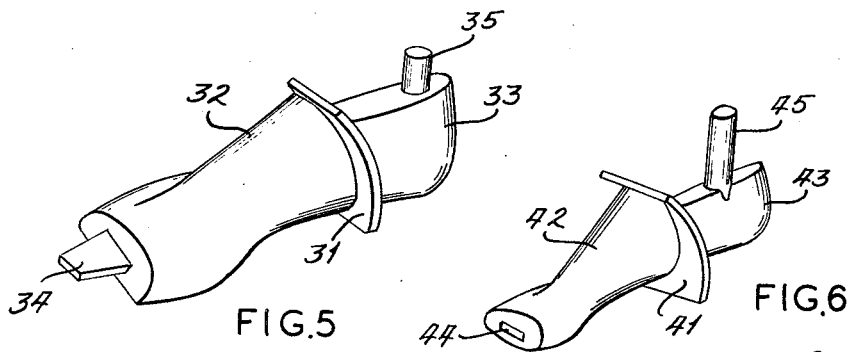
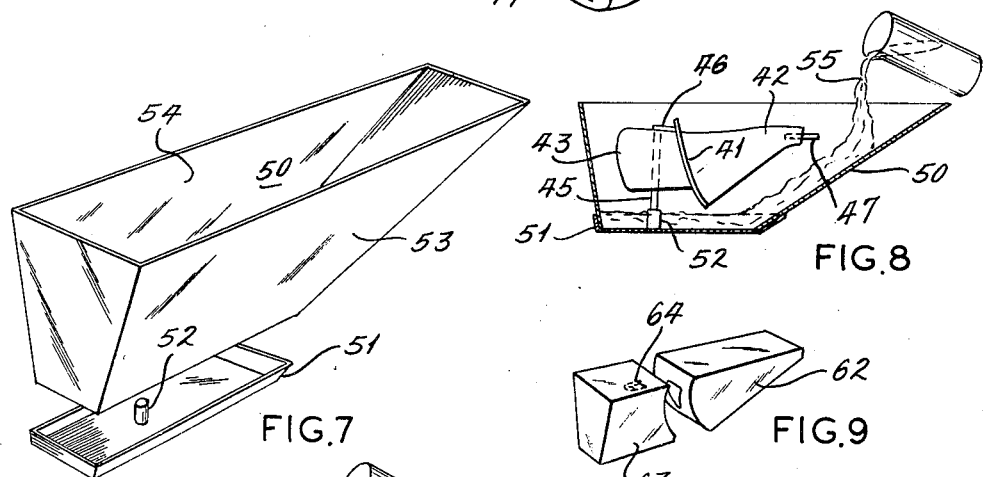
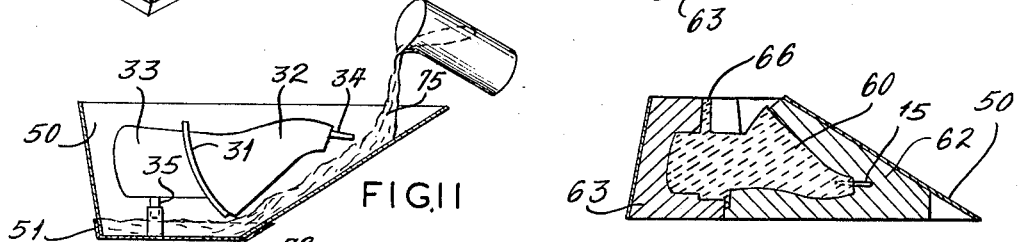
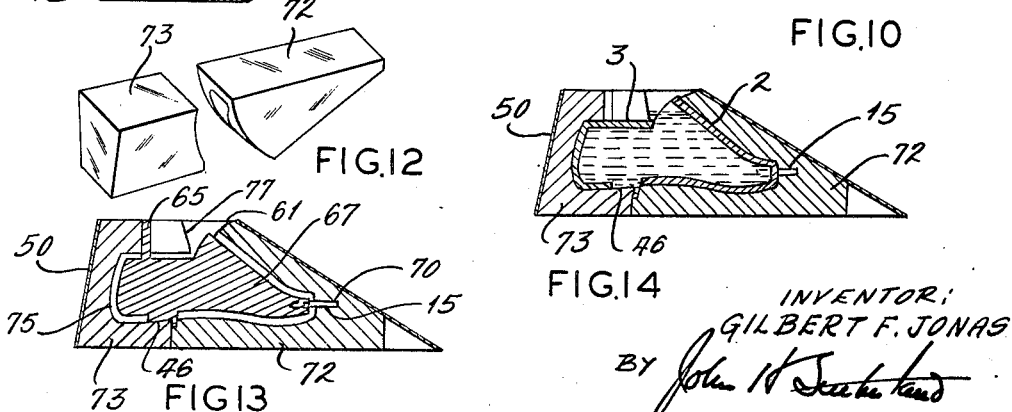
INVENTOR:
GILBERT F. JONAS
BY
ATTORNEY, UnitedStates Patent Office 3,501,793
Patented Mar. 24, 1970

3,501,793
SHOE LAST
Gilbert F. Jonas, Nashville, Tenn., assignor to Genesco, Inc., Nashville, Tenn., a corporation of Tennessee
Filed May 6, 1966, Ser. No. 548,144
Int. Cl. A43d 3/00, 23/00
U.S. Cl. 12—136                                8 Claims

ABSTRACT OF THE DISCLOSURE

For use in the manufacture of shoes, a last having complementary heel- and fore-parts connected together by a detachable hinge which connects with the fore-part more remotely from the parting line (between said heel-part and fore-part) than its connection with said heel-part.

---

The invention relates to lasts for the manufacture of shoes, and particularly to molded lasts and their manufacture.

Lasts for use in the manufacture of shoes have conventionally been made of hardwood, but, in recent times, lasts molded of aluminum and synthetic plastics have been proposed. These have usually been solid lasts, and hence heavier than need be, with correspondingly high cost of manufacture, but there have been some disclosures of more or less hollow molded last parts. The latter have not gone into substantial use in industry for several reasons. First, the tooling and machinery required for their manufacture are complex, costly and require highly skilled labor. Second, the molds in which they are formed do not lend themselves to the grading techniques exercised in moving from a "model" size to the numerous other "widths" and "sizes" required to complete a tariff of shoes which will fit the variety of feet which are normally expected to be served. Third, the hinging means conventionally employed in hardwood lasts—with somewhat less than optimum satisfaction—is less so when applied to hollow molded last parts which, by virtue of being hollow, provide substantially less abutting surface area than do solid last parts.

The hinging of last heel-parts to last fore-parts has long been a necessary evil in shoe manufacture. The last must be hinged in order to extract it from most completed shoes. The easier it hinges when hinging is desired, the more likely it is to hinge when hinging is incompatible with the operation being performed on it. In many shoe manufacturing operations, a last, bearing a partially completed shoe, is sustained by a jack engaging a thimble in the heel-end of the last, while forces of considerable magnitude are exerted on the fore-part of the shoe in a direction tending to "break" (i.e., move the hingedly connected parts relative to each other) the last. Such unwanted "breaking" of the last, while inflicting no damage upon the last, may, and frequently does, damage the shoe being made on the last.

Hinged lasts of the usual construction include a hinge axis concentric with contragenerically arcuate short-radius portions of the abutting surfaces between the fore-part and heel-part; and also include a linkage pinned at one end to the fore-part and at the other end to the heel-part. The arrangement is such that the heel-part cannot readily be separated from the fore-part when it is desired to repair or replace one of the parts.

The objects of the present invention are to provide lasts of a character such as to overcome the disadvantages of, and the objections to, lasts of conventional construction, and to provide a facile and economic method of making lasts, particularly hollow lasts, from moldable materials.

These and other objects are achieved, in accordance with the present invention, by taking a last (which may be, and preferably is, a one-piece last) corresponding in contour and dimensions to that on which a satisfactory model shoe has been made; parting the last at a position corresponding generally to the location of the inter-face between the fore-part and the heel-part of a corresponding hinged last (such as that on which the model shoe was made); inserting, at the parting surface, a web of uniform thickness, and of expanse (widthwise and heightwise) somewhat greater than that of the last; securing the web to the last parts so that the latter are aligned with each other, as in the operating condition of the last, but spaced from each other by the thickness of the web which extends outboard of the last parts; then using the composite webbed last as a mold pattern for producing a matrix within a semi-permanent mold block which is cast about the mold pattern. Once the mold material has set about the mold pattern, the mold block is then severed at the web of the pattern, preferably in such manner as to preserve the impression resulting from the presence of the web between the fore-part and the heel-part of the pattern. The latter is accomplishable automatically when, as is preferred, the web is contoured and proportioned to fit the interior of a flask in which the mold block is cast, in which event the web forms a dam which prevents, in whole or in part, the fore and aft portions of the mold block from unification. The severed parts constitute a set of last mold blocks having a cavity corresponding (save for the web) to the contour and dimensions of the model last, and in which can be cast parts which are duplicates of the fore-part and heel-part of the model last. Having severed the respective fore and aft portions of the mold block from each other, they are removed from the pattern. Such removal is facilitated if, as preferred, the mold blocks be made of elastomeric molding material having sufficient elasticity to yield enough to release the re-entrantly curved portions of the mold pattern, as well as last parts subsequently molded therein. After removal of the pattern therefrom, the set of mold blocks may be brought into conjunction at the faces previously defined by the web, thereby forming a two-piece mold matrix into which any suitable, preferably thermosetting, plastic material may be poured to produce a solid last, or, with the aid of an appropriate core, to produce a hollow last.

The production of an appropriate core for the molding of hollow lasts, in the set of mold blocks just described, involves a comparable procedure, starting with a duplicate of the model last which has been turned to reduce its dimensions by the desired wall thickness in the hollow last parts to be produced. The turned-down duplicate last is severed at the same location before a web is inserted at the parting surface—the web being preferably identical in dimensions and contour with that of the mold pattern—and the composite is used as a core pattern about which a core mold block, preferably of elastomeric material, is cast, then severed as before to permit removal of the core pattern. This results in a set of core mold blocks having a cavity which is smaller (by the desired wall thickness of the last parts to be molded) than the cavity in the above-described set of last mold blocks. In severing the core mold block, however, the impression of the web is preferably preserved.

Duplicates of the core pattern are cast in the set of core mold blocks. Such duplicates preferably include duplicates of the web which will serve a useful function in the molding of the last parts. The duplicates of the core pattern are denominated cores, and are preferably cast of material, such as wax, which has a melting point high enough to maintain its solid state at pouring temperature of the last molding material to be used, but such melting point being low enough to permit fluidization of the core, without damaging the molded last parts after they have set to a selfsustaining state which may be prior to its final set. After the core has set in the core mold blocks, the latter are separated, and the core (preferably including a replica of the web) is withdrawn.

The resultant core is then placed in the cavity of the set of last mold blocks. The body of the core is smaller than the cavity in the last mold blocks by the desired wall thickness of the ultimate hollow last, but, if, as preferred, the web of the core is the counterpart of the impression made in the last mold blocks by the web of the mold pattern, the web of the core interfits with said impression to properly locate the core within the cavity of the set of last mold blocks. Also if, as preferred, the web of the core extends outboard of the body of the core for a distance at least equal to the desired wall thickness of the last parts to be made, the web of the core forms a dam in the cavity which can prevent the last parts molded fore and aft thereof from being molded integrally. However, if such fore and aft parts are molded integrally, they can be severed.

With a core properly disposed in the cavity of the set of mold blocks, the interspace is filled with last molding material. If desired, reinforcement material, such as glass fiber or the like, may be placed in the interspace, or at limited regions therein which it is desired to reinforce, prior to pouring the last molding material into the interspace. Once the last molding material has set sufficently to retain its shape, the core may be fluidized and poured out with or without first separating the set of core mold blocks.

Thereafter, the hollow molded last parts can be hinged together in any desired manner. However, in the interest of minimizing the amount of molding material consumed and conserving weight of the resultant last, it is preferable to make the walls of the last parts as thin as practical. The lesser the wall thickness, the weaker the structure and the greater the portent that the walls will fail under the forces to which the last is subjected in normal use, where substantial downward forces are exerted on the bottom of the fore-part while the last is sustained bottom-side-up on a jack which has a spindle, extending into a conventional thimble in the heel-part of the last, while a shoulder surrounding the spindle bears against the top (now down) surface of the heel-part. Such forces are normally transmitted from the fore-part through the heel-part to the jack, and are so directed as to tend to "break" the ordinary last about its hinge, as well as to subject the last heel-parts, in particular, to compression and shear which thin-walled last parts cannot withstand. The present invention, however, contemplates a hinge construction so mounted as to transmit the major portions of such forces directly to the thimble—hence to relieve the wedgedly related interface, between the fore-part and the heel-part, of the severity of such forces—and thereby to permit a wall thinness which could not otherwise be tolerated if such forces were transmitted through said interface. Furthermore, the hinge construction of the present invention can be, and preferably is, so related to the fore-part that it constitutes a reinforcement for the bottom thereof with two results, viz.: to permit the bottom wall of the fore-part to be made thinner than could otherwise be tolerated; and to so distribute the greatest of the subject forces that their afore-mentioned tendency to "break" the last about its hinge is not eliminated, but reversed. And, withal, the heel-part and fore-part of the last are more quickly and easily assembled and disassembled than heretofore.

Generally stated, these results are achieved by integrating the conventional thimble with stiff structural member which extends forwardly of the longitudinal mid-point of the last, preferably forwardly of the ball portion of the fore-part, and at least partway is in force-transmitting contact with the interior of the bottom wall of the fore-part of the last. Such stiff structural member is hinged at its forward extremity, which is preferably as close to the toe end of the last as practicable where it is interlocked with a hinge seat characterized by limited resilience in the direction lengthwise of the last.

While many of the above-related features are of utility independently of some or all of the other features, an embodiment including all such features is illustrated in the accompanying drawings, in which:

FIGURE 5 is a perspective view of a last pattern for use in preparing last molds in accordance with the present invention;

FIGURE 6 is a perspective view of a core pattern for use in preparing core molds to reproduce the interior surface of a hollow, molded last in accordance with the present invention;

FIGURE 7 is an exploded view of a mold flask for preparing both core molds and last molds in accordance with the present invention;

FIGURE 8 is a longitudinal section showing the core pattern of FIGURE 6 disposed in the flask of FIGURE 7 in the process of molding a dispensable duplicate of the core pattern;

FIGURE 9 is a perspective view of the core mold resulting from the operation illustrated in FIGURE 8;

FIGURE 10 is a longitudinal sectional view of the core mold shown in FIGURE 9;

FIGURE 11 is a longitudinal section showing the mold pattern of FIGURE 5 disposed in the flask of FIGURE 7 in the process of preparing the mold for the last;

FIGURE 12 is a perspective view of the last mold resulting from the operation shown in FIGURE 11;

FIGURE 13 is a longitudinal section of the last mold shown in FIGURE 12 assembled about a dispensable duplicate of the core pattern shown in FIGURE 6, said duplicate having been cast in the mold shown in FIGURE 10, and the assembly being ready for the reception of fluid molding material; and FIGURE 14 is a view corresponding to FIGURE 13, but showing the molding material in the space between the core duplicate and the interior wall of the mold cavity, with the core material now liquid.

Figure 1:
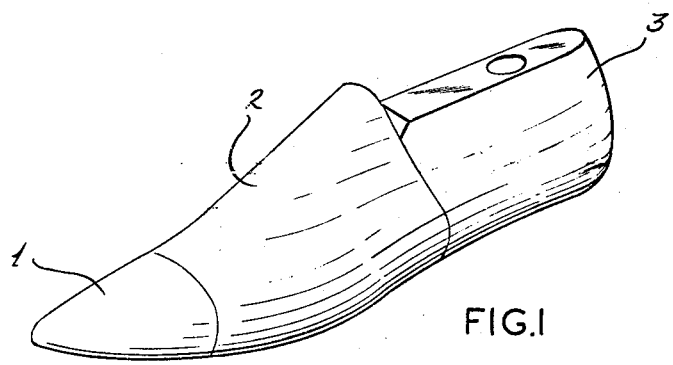
FIGURE 1 is a perspective view of a hollow, molded last constructed in accordance with the present invention.
Figure 2:
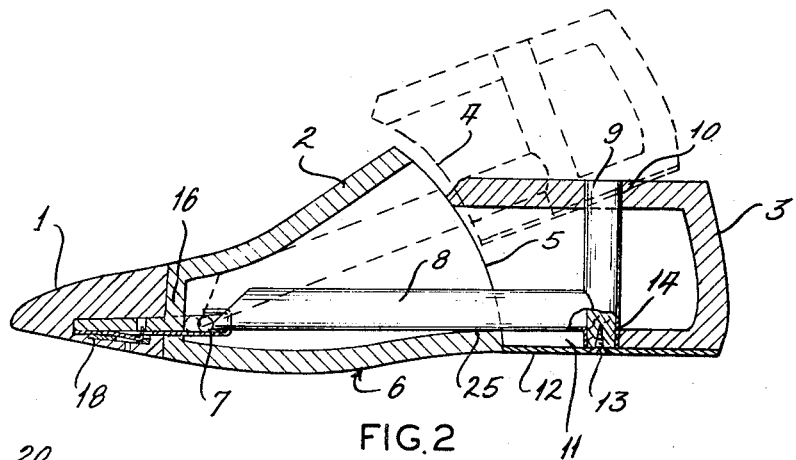
FIGURE 2 is a longitudinal sectional view of the last shown in FIGURE 1.
Figures 3, 4:
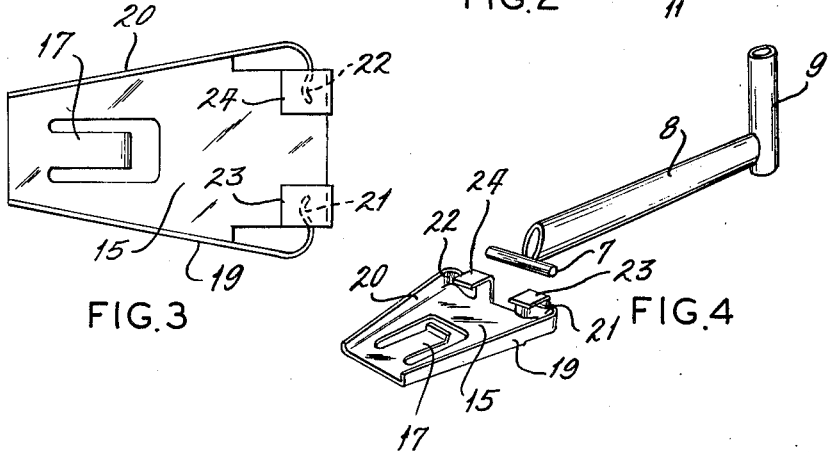
FIGURE 3 is a plan view of a removable toe part latch and a hinge bar mounting member employed in the last shown in FIGURES 1 and 2.
FIGURE 4 is an exploded view of the member shown in FIGURE 3 in association with the hinge bar member shown in FIGURE 2.

In the form illustrated in the drawings, the last, as shown in FIGURES 1 and 2, is provided with an interchangeable toe part 1, in accordance with the disclosure of Patent No. 3,241,166, and the last parts to be produced are adapted for use in connection with such interchangeable part lasts, but it will be understood that the invention is not limited to lasts having such interchangeable extremity parts.

The last body consists of a fore-part 2 and a heel-part 3, which are preferably molded hollow, as hereinafter disclosed in detail. The rear end 4 of fore-part 2 is contoured to provide a sloping surface which makes the longitudinal dimension of the fore-part 2 shorter in the upper region of the last than at the bottom thereof. In the form shown in the drawings, the rear end 4 is arcuately contoured to provide a convex surface which may or may not be a sector of a circle having a relatively long radius. The heel-part 3 of the last has a forward end 5, which is contoured to be complemental with rear end 4 of fore-part 2 when the last is in its operating position shown in full lines in FIGURE 2. On the other hand, the end surfaces 4 and 5 are preferably so contoured that when they are moved to the position shown in dotted lines in FIGURE 2, some space will exist between end surfaces 4 and 5. Regardless of the contour of end surfaces 4 and 5, they are preferably so congruent with each other that they wedge together tightly when the last is in the operating position shown in full lines in FIGURE 2, but have sufficient play between them, when the last is "broken" (as shown in dotted lines in FIGURE 2), that they may be moved relative to each other to an extent sufficient to disengage the hinge connection between them, and now to be described.

The hinge connection of the present invention is characterized by the feature that when the parts 2 and 3 are in the operating position shown, and a shoe being made thereon is being subjected to forces of the magnitude employed in conventional practices, such as sole laying and bottom leveling, the greatest forces will tend to tighten the wedging relation between end surfaces 4 and 5, as distinguished from moving the parts 2 and 3 toward the "broken" position which loosens the wedging relation. This result is accomplished by locating the only hinge axis connecting fore-part 2 with heel-part 3 at a position forwardly of the longitudinal mid-point of the last, as illustrated in the embodiment shown at point 6.

In the embodiment shown, the hinge axis between fore-part 2 and heel-part 3 is defined by a hinge pin 7 which, in the form shown, is fixedly attached to the heel-part 3 through a hinge bar 8 and a metallic thimble 9, the latter of which has its upper end received in a hole 10 through the upper wall of heel-part 3, and its lower end secured in a key-hole shaped recess 11 in the bottom wall of heel-part 3, and fixedly attached thereto by means of a heel plate 12 and a screw 13, which penetrates a wooden dowel 14 secured within the bottom end of thimble 9. The heel plate 12 may, if desired, be otherwise secured to the bottom surface of heel-part 3. In any event, the connection between hinge pin 7 and heel-part 3 is preferably such that there be no relative movement between the hinge pin 7 and the heel-part 3 after the components are assembled together. The key-hole shape of recess 11 has a round portion matching the exterior cross-section of thimble 9, and a straight portion paralleling bar 8 with a width sufficient to pass the minor (i.e., horizontal) diameter of oval-shaped bar 8.

The hinge pin 7 is mounted for rotation in a seat provided by a metallic plate 15 embedded in the forward end wall 16 of last fore-part 2. The plate 15 has a portion projecting inwardly of wall 16, and another portion projecting forwardly thereof. The portion projecting forwardly provides a spring catch 17 for inter-engagement with a hole in a plate 18 embedded in the interchangeable toe part 1 where such is provided, but if such is not provided, those portions of plate 15 which project forwardly of wall 16, as shown in FIGURE 2, may be embedded in the solid substance of a toe part integral with last fore-part 2, but, if desired, such forwardly projecting portions may be omitted from plate 15. The portions of plate 15 which extend inside the hollow portion of last fore-part 2 provide, in the form shown in the drawings, a spring seat for hinge pin 7. To produce such a spring seat, the opposite side margins of plate 15 are bent into opposite flanges 19 and 20, the rear extremities 21 and 22 of which are slit from the substance of plate 15, so as to provide cantilever springs extending toward each other, which springs are resilient in the longitudinal direction of the composite last. A pair of ears 23 and 24 are also integral with plate 15, and are bent upwardly behind and forwardly over the extremities of spring fingers 21 and 22, as clearly shown. To assemble the hinge pin 7 within the seat provided by spring fingers 21 and 22 and confined by ears 23 and 24, the heel-part 3 of the last, together with thimble 9 and hinge bar 8 secured thereto, must be moved into the "broken" position of the last, so that the hinge pin 7 will pass over the extremities of ears 23 and 24 and between them and the adjacent end wall 16 of last fore-part 2 in which plate 15 is embedded. Once the hinge pin 7 has been entrapped by the ears 23 and 24, movement of the heel part 3 relative to fore-part 2, so as to put the last in its operating condition shown in full lines in FIGURE 2, is resisted by the resilience of spring fingers 21 and 22. Hence, when the last parts are in operating condition, there is a constant force exerted by the spring fingers tending to wedge parts 2 and 3 together.

In the preferred form, when the last parts 2 and 3 are in their operating position, the bottom side of hinge bar 8 is in engagement with the interior bottom surface of last fore-part 2, as shown at 25. Consequently, when forces are applied to the shank area of a shoe being constructed on the last, as under conditions of bottom leveling and sole laying, any tendency of such forces to move the fore-part 2 relative to the heel-part will meet the reaction of hinge bar 8; and so will be the case with all forces applied to the bottom of a shoe being made on the last, save those forces which are applied forwardly of hinge pin 7, a region at which the forces applied under normal shoe manufacturing conditions, while the last is supported through a thimble such as 9, are of much less magnitude than those applied along the shank and ball area of the shoe bottom.

To produce the hollow, molded last parts 2 and 3, the invention contemplates that a mold pattern, such as that shown in FIGURE 5, be made from an ordinary last corresponding to one on which a model of the desired shoe has been made. Such ordinary last is severed along a line corresponding to the contour of abutting surfaces 4 and 5 of the finished last. The severance surfaces can be planar, surfaces of revolution or otherwise, but in the embodiment shown, they slope upwardly and forwardly from the bottom. This separates the conventional last into two parts corresponding in exterior contour and dimensions to the fore-part 2 (with or without removable extremity) and heel-part 3, respectively. Such two parts of the model last are designated 32 and 33 in the complete mold pattern shown in FIGURE 5. The parts 32 and 33 are then re-assembled with a web 31 intervening, and the parts 31, 32 and 33 are secured together as by adhesive, so that heel-part 33 is aligned with fore-part 32 in precisely the same orientation as existed in the model last, save that they are separated by the thickness of web 31. The web 31 may be made of plywood, hard board, metal, or any other sheet material which is stable under the conditions of use to which is will be subjected. When making a last for a removable toe part such as 1, the forward end of fore-part 32 is preferably provided with a projection 34, whose shape and dimensions correspond approximately to the shape and dimensions of a connector, such as the forwardly projecting portion of plate 15. The usual thimble in the heel-part of the last is provided with a dowel 35 projecting substantially above the highest portion, such as the tip of the cone in the composite of parts 31, 32 and 33. The composite of parts 31, 32, 33, 34 and 35 is then used as the pattern for forming the matrix in a mold, as later to be described in connection with FIGURES 11–14.

In order to cast a hollow last, it is necessary to provide a core sufficiently smaller in size than the matrix of the mold that the appropriate wall thickness of the resultant cast last parts will be defined by the space between the core and the matrix. Accordingly, the invention contemplates reproducing pattern parts 32 and 33 in a contour which is geometrically similar, but sufficiently smaller than those of the pattern shown in FIGURE 5, that the difference will represent the desired wall thickness for the hollow cast last parts. For example, a duplicate of the last from which pattern parts 32 and 33 were made may be turned down in a lathe so as to remove about a quarter inch at each increment of surface. Such turning is preferably accomplished before the last is severed in twain, but if it is desired to sever the last before such turning, no such reduction in dimension will be made at the interface corresponding to 4–5. Having turned the duplicate last down to the lesser dimension, the reduced last is severed to produce fore-part 42 and heel-part 43, which are then re-assembled with a web 41 between them, as in the case of the mold pattern shown in FIGURE 5. For a reason which will later appear, it is preferred that the web 41 be exteriorly contoured and dimensioned precisely like web 31 of the mold pattern. The customary thimble, which will be in heel-part 43, is filled with a dowel 45, which projects upwardly to an elevation relative to the upper edge of web 41, which corresponds to the elevation of dowel 35 relative to the upper edge of web 31. Unlike the mold pattern, the dowel 45 in the core pattern extends downwardly of the bottom of heel-part 43 for a distance corresponding substantially with the wall thickness desired in the end product; and the space between that extension of dowel 45 and the web 41 is filled with a block 46. In view of the reduction of the dimensions of fore-part 42 and heel-part 43 relative to fore-part 32 and heel-part 33, the web 41 will extend farther downwardly, relative to the bottom of parts 42 and 43, than does web 31 relative to the bottom parts 32 and 33. Likewise, when, as preferred, web 41 is of identical dimension and contour to web 31, the web 41 will extend more outboard in all direction, relative to parts 42 and 43, than will web 31 extend outboard of parts 32 and 33.

It will be understood that when the lasts to be produced are not to be provided with interchangeable toe extremities, the fore-parts 32 and 42 will be contoured to produce the desired toe shape, but with the aforesaid differential in dimensions. When, as in the embodiment shown, it is desired to provide the last with a hinge seat projecting inwardly from the forward wall of the fore-part, the fore-part member 42 is provided with a recess 44 for accommodating the rear end of a plate 47 whose forward end projects forwardly and is identical with that portion of plate 15 which is forward of the inside of wall 16 in the complete last. The composite of parts 41, 42, 43, 44, 45, and 47, constitutes a pattern for the core of a mold in which dispensable duplicates of the core pattern are to be cast, as later described.

In the preferred method of casting hollow last parts, the core, which forms the interior wall of the casting, is destroyed during the operation, although the material of the core may be repeatedly reused. Accordingly, it is necessary to provide a new core for each last cast, and all such cores are the duplicate of the core pattern such as that shown in FIGURE 6, save for the plate 47 which, in the dispensable duplicates, will be an entire plate 15. The dispensable duplicates of the core pattern are preferably cast of material having a melting point above the pouring temperature of the material from which the ultimate last parts are to be cast, and a melting point below temperatures which will be tolerated by the ultimate last part castings. A typical such material for casting duplicates of the core pattern shown in FIGURE 6 is dental wax, but various other materials may be employed.

The first step in making such duplicate cores is to provide a mold therefor, which mold has a cavity or matrix contrageneric with the core pattern, such as that shown in FIGURE 6. The mold is preferably a permanent mold, or at least a semi-permanent mold, and in view of the presence of re-entrant contours on the usual last, such a permanent mold is preferably made of elastomeric material which may be set in situ in an appropriate flask about the core pattern. The elastic properties of the mold, as set in situ about the core pattern, must be sufficient to enable removal of the core pattern, as well as duplicate cores, therefrom without mutilation of the exterior surface of the core pattern or the cores, as otherwise the mold will require subdivision into numerous parts.

The casting of the mold requires that the mold material be confined while it is setting, and since elastomeric material is employed, the use of the mold in making reproductions of the core pattern requires that the mold be confined while it is being used as a mold. Accordingly, a flask is provided for confining the material of the mold during the process of making the mold, as well as for confining the parts of the mold during their use as a mold. A suitable flask is shown in FIGURE 7, and preferably consists of two pieces, one of which, 50, is a truncated, hollow pyramid, and the other of which, 51, is a tray which forms a removable bottom for part 50. The shape and size of the part 50 is optional, provided its volume is sufficient to accommodate a body of material sufficiently greater than the article to be cast therein that the resulting mold will be substantially self-sustaining, and substantially shape-retaining, except when subjected to local pressures while out of the flask. In the form shown, the flask member 50 is so proportioned as to minimize the amount of mold material necessary for the making of molds about patterns for a substantial range of last sizes. The side walls of flask member 51 are proportioned to fit snugly about the exterior of the small open end of flask member 50. The latter is also provided with an upstanding ferrule 52, or other comparable means for positioning a pattern within the flask, and retaining it so positioned while the mold is being cast. In the embodiment shown, the ferrule 52 is arranged to receive either dowel 45 of the core pattern shown in FIGURE 6, or dowel 35 of the last mold pattern shown in FIGURE 5.

As shown in FIGURE 8, the heel-part 43 of the core pattern is provided at the bottom thereof with a block 46 of width equal to the minor diameter of bar 8, and of length sufficient to bridge the gap between the portion of dowel 45 which projects beyond the bottom of heel-part 43 and the portion of web 41 which projects beyond the bottom of parts 43 and 42.

To cast duplicates of the pattern shown in FIGURE 5, the several parts are related as shown in FIGURE 8, with the side edges of web 41 either in contact, or nearly so, with opposite side walls 53 and 54 of flask member 50. Thus, the web 41 forms a dam or weir between side walls 53 and 54 of the flask, and delineates, in the resultant cast mold, a parting line along which the mold may be severed in twain, as shown in FIGURE 9, to provide a fore-part mold 62 and a heel-part mold 63.

Having positioned the pattern within the flask, as shown in FIGURE 8, the flask may be filled to a level above the pattern, as by pouring liquid elastomeric material 55 into the flask. It should be understood, however, that the mold may be made of material which is charged into the flask in a state other than liquid, as, for example, by charging the flask with particulate material which either reacts, or otherwise solidifies in situ about the pattern to produce a block whose exterior contour is determined by the shape of flask member 50, and which has a cavity conforming to the shape and size of the pattern within it, including a recess at the tip formed by plate 47. Once the block has set, the flask member 50 is inverted, tray 51 lifted off, and the cast mold pushed out through the larger open side of the flask. The converging relation of the side walls of flask member 50 facilitates such removal. Once the cast mold block is removed from the flask member 50, it may be severed along the lines delineated by the edges of web 41, so that the mold block can be separated in two pieces by moving the opposite ends lengthwise relative to each other, as shown in FIGURE 9. During such movement, the heel end 43 of the core pattern will be anchored in position by the embedment of dowel 45 in the surrounding mold material, but it can be released therefrom by slitting heel-part mold 63 between dowel 45 and web 41, so that the parts of mold block 63 adjacent dowel 45 can be flexed apart to release the portion of dowel 45 which projected into ferrule 52. However, at the opposite side of the mold block 63, the portion of dowel 45 which projects above heel-part 43 is free to pass through the slot made by block 46, but such may be facilitated by slitting comparable to that above described. Such slitting does not impair the future utility of the mold blocks for casting reproductions of the core pattern shown in FIGURE 6, because when the mold blocks are re-inserted in the flask, the walls of the flask will wedge such slits closed, and maintain them closed during the molding operation.

Removal of the fore-part 42 of the core pattern from fore-part mold block 62 may normally be achieved by applying sufficient force to pull the pattern out of the mold block, and in the course of such pulling, the elasticity of the block will accommodate the removal. On the other hand, if the fore-part 42 of the core pattern has such degree of re-entrant curving that the elasticity of the mold material will not release it, it, too, may be slit longitudinally to accomplish the release.

Once the core pattern is removed from the mold blocks 62 and 63, the latter are re-assembled within flask part 50, as shown in FIGURE 10, and, with the flask part 50 and contained mold parts inverted as shown in FIGURE 10, the cavity 60 formed by the core pattern is ready for the reception of mold material to duplicate the core pattern shown in FIGURE 6. Before pouring, however, a plate 15 is inserted in the recess impressed by plate 47, and, if desired (but not shown), hinge parts 8–9 may be positioned in the mold cavity. The mold may then be filled by pouring liquid wax, or other appropriate core material, into the composite mold through hole 66 left by dowel 45 and ferrule 52, or any other suitable gate. The wax reproduction of the core pattern with the rear portion of plate 15 embedded in it is then removed from the mold parts in the same manner as described above in connection with the removal of the core pattern itself.

The number of wax duplicates of core patterns thus made corresponds to the number of duplicates of the last pattern (shown in FIGURE 5) which are to be made so that there will be one dispensable core for each hollow last to be cast, as now to be described.

The procedure for molding the hollow lasts is comparable to that above described for molding the reproductions of the core pattern, using the last mold pattern shown in FIGURE 5 rather than the core pattern shown in FIGURE 6. As illustrated in FIGURE 11, the last pattern shown in FIGURE 5 is mounted in flask member 50 with its dowel 35 engaged with ferrule 52. Since, as pointed out above, the exterior contour of web 31 of the last pattern is preferably identical with the exterior contour of web 41 in the core pattern, web 31 will form, against the opposite side walls 53 and 54 of the flask member 50, a similar dam or weir. Elastomeric mold material 75, which may be the same as that employed in making the core mold blocks, is then poured into the flask completely surrounding the last mold pattern. When the mold material is set, the flask is inverted and the block severed along the line defined by web 31, to produce a fore-part mold block 72, and a heel-part mold block 73, from which the pattern may be removed as described above in connection with the removal of the core pattern.

The mold blocks 72 and 73, as well as mold blocks 62 and 63, may be made of any of a variety of moldable plastics which have elastomeric properties, such as to yield a durometer of 45 or thereabout. Suitable such materials are thermo-setting polyether urethanes and room-temperature or low-temperature vulcanizing silicone resin.

The mold blocks 72 and 73 are then re-assembled within flask 50, as shown in FIGURE 13, with a wax duplicate 67 of the core pattern shown in FIGURE 6 positioned therein by the wax counterpart 61 of web 41, and the wax counterpart 65 of dowel 45 occupying, respectively, the cavity made by web 31 and the hole made by dowel 35 and ferrule 52 in the mold block 73. Since the wax duplicate 67 of the core pattern is smaller in all dimensions than the last pattern shown in FIGURE 5, the wax duplicate 67 will be spaced from the cavity within blocks 72 and 73 so as to define a clearance 74 at the fore-part 72, and clearance 76 in the heel-part 73. The two clearances 74 and 76 do not inter-communicate save at gate 77, which is open to clearance 74 ahead of web 61 and open to clearance 76 behind web 61. Except adjacent gate 77, the two clearances 74 and 76 are dammed off from each other by the presence of web 61. The magnitude of the respective clearances 74 and 76 predetermines the thickness of the walls of the hollow last parts to be molded.

The clearances 74 and 76 are then filled with a last-forming material, preferably liquid, so that it can be poured into gate 77 and flow therefrom into the respective clearances. Thermosetting molding material, such as epoxy resins, polyether urethanes, polysulfons and acrylics, which set rigid, e.g., Durometer 85, is preferred in this instance, and particularly one which is fluid at a temperature below the melting point of wax core 67, but which, in the process of setting, is sufficiently exothermic to melt wax core 67. If desired, the filled mold can be placed in a vacuum chamber to eliminate entrapped air. When core 67 has been melted (either by exothermy of the setting molding material, or by extrinsically applied heat), and the last-forming molding material set, at least to the point that it will suffer no loss of shape when the molten material of core 67 is removed, the latter is poured out. The condition of the parts when core 67 has become molten is shown in FIGURE 14. The flask 50, containing the mold blocks, is inverted to pour out the liquefied core 67 either through gate 77 while air is admitted through the hole formed in mold block 73, or vice versa. Thereafter, when the last molding material has assumed its final set, the mold blocks 72 and 73 may be removed from flask 50, and the hollow molded last parts withdrawn from the mold blocks. At this time, the hollow molded last fore-part 2 and the hollow molded heel-part 3 are connected together only by whatever sprue exists in gate 77, but otherwise are separated one from the other because web 61, which initially separated clearance 74 from clearance 76, has been removed in fluid state.

When it is desired to produce last parts having interchangeable toe parts such as 1, the projection 34 on the last pattern fore-part 32 forms a cavity 70 in mold block 72; and prior to inserting the dispensable core duplicate 67 into mold block 72, a plate, such as 15, is inserted in the recess corresponding to 44 in core pattern fore-part 42. In this way, the ultimate hollow molded last fore-part 2 is set in situ about the central section of plate 15, with latch 17 projecting forwardly of part 2, and spring fingers 21 and 22, as well as ears 23 and 24, projecting into the hollow interior of last fore-part 2.

It will be obvious that when the fore-part 2 is not intended to be used with an interchangeable toe part, the projection 34 on mold pattern fore-part 32 will be eliminated, and fore-part 32 projected to define the desired contour for the toe area of the last. However, when it is desired to provide the ultimate last with a hinge which is anchored in situ in the last molding material, the recess 44 of the core pattern fore-part 42 is preferably retained, and prior to the insertion of the core duplicate 67 into mold block 73, a plate embodying the features of the rear portion of plate 15, or its equivalent, is inserted in that recess, so that it extends into clearance 74.

If desired, the hinge bar, consisting of parts 7, 8 and 9, may be molded within wax duplicate 67 when the latter is cast in the mold shown in FIGURE 10. This is accomplished by positioning the thimble 9 in hole 66 of heel-part 63 of the mold, it being understood that since the vertical dimension of the thimble is the same as the vertical dimension of the finished last heel-part 3 (or of heel-part 33 of the pattern shown in FIGURE 5) that dimension will be sufficiently greater than the corresponding dimension of the wax duplicate that the upper end of the thimble, at least with the aid of an auxiliary dowel, can be held in position within core pattern cavity of the mold shown in FIGURE 10.

Ordinarily, however, it is preferred to insert the hinge bar into the heel-part 3 of the last after the latter is cast.

This is readily accomplishable when the core pattern is provided with block 46 of a height corresponding to the ultimate bottom wall thickness of heel-part 3, and of a width corresponding to the maximum horizontal dimension of hinge bar member 8, a key-hole shaped slot 11 is formed in the bottom of heel-part 3 which permits passing the thimble 9 (and associated bar 8) into heel-part 3 from the bottom up where it may be secured in proper position by dowel 14 in hole 11, it being understood that the horizontal diameter of thimble 9 and the circular part of slot 11 is greater than the horizontal diameter of bar member 8.

After the hinge bar has been appropriately secured in the heel-part 3, the parts 2 and 3 of the last may be joined together by placing them in the position indicated in dotted lines in FIGURE 2, and maneuvering them until the ends of pin 7 have passed under lips 24, whereupon parts 2 and 3 are hinged about the axis of pin 7 until the position shown in full lines in FIGURE 2 is attained. The composite last is then ready for use in the manufacture of shoes.

Those skilled in the art will recognize the economy of manufacturing lasts in accordance with the present invention, and the facility with which such lasts can be assembled and disassembled, so that the respective parts thereof may be readily replaced as and when desired. The method of molding the last parts lends itself to the use of a variety of materials from which to mold lasts, and permits such molded lasts to be reinforced with fibrous or stranded material to give strength where strength is needed, without necessarily providing more strength than is needed at portions which do not need reinforcement. The resultant lasts are durable, stable, immune to shrinkage and swelling, and are not deleteriously affected by ambient conditions under which they are used. Consequently, shoes made on lasts constructed in accordance with the present invention will be more uniform, and their fit and sizing can be more precise because, unlike the conventional wooden lasts, the hollow molded plastic lasts of the present invention do not warp, bend, or otherwise change shape under the pressures exerted upon the bottom of the shoe during manufacture, or under the conditions of storage.

While a complete embodiment of the molding process, the hinge structure, and the composite last, has been disclosed in detail, it is not to be understood that the invention is limited to the details of that embodiment. On the contrary, as pointed out hereinbefore, various features of the invention may be used with advantage without others, and of course it is contemplated that such modifications and variations may be made in the details of the construction herein disclosed as an illustrative embodiment which may be desirable to satisfy the requirements of particular situations.

Having thus described the invention, what is claimed and desired to be secured by Letters Patent is:

1. A shoe last having a fore-part and heel-part abutting at a sloping surface, said parts being connected together by hinge member fixedly connected to said heel-part and releasably connected with said fore-part at a hinge axis located more remote from said sloping surface than the location of affixation thereof to said heel-part, said hinge member being connected to said fore-part through means which is resiliently yieldable in the direction of said heel-part.

2. The last of claim 1 wherein the hinge member is connected to said fore-part through hook means engageable with and disengageable from said hinge member, spring parts which are resilient in the direction of said heel-part, said spring parts defining the axis of rotation of said hinge member and being located forwardly of the longitudinal midpoint of said last.

3. The last of claim 2 wherein said heel-part and said fore-part are hollow and composed of thermoset plastic, the fore end of said fore-part having a latch member embedded therein and projecting forwardly therefrom, said latch member extending through the fore end of the fore-part and projecting on the interior thereof, and the interior projection of said latch member providing the hinge axis for said hinge member.

4. A shoe last having a fore-part and heel-part abutting at a sloping surface, said parts being connected together by a hinge member connected to said fore-part at a location more remote from said sloping surface than the location of its connection to said heel-part, said hinge member having means rendering it resiliently yieldable in the direction athwart said sloping surface.

5. The last of claim 4 wherein said hinge member has a hinge axis located adjacent the bottom of the last at a position remote from said sloping surface.

6. A shoe last having a fore-part and heel-part abutting at a sloping surface, said parts being connected together by a hinge member which includes:
 (a) a thimble member in said heel-part, and
 (b) a hinge bar integrally connected at one end to said thimble member and releasably connected at its other end to said fore-part at a location more remote from said sloping surface than the location of said thimble member.

7. A shoe last having a fore-part and heel-part, said fore-part being hollow and having a forward wall at its toe end, a hinge member connected to said fore-part and heel-part, said hinge member being fixedly connected to said heel member, said hinge member being pivotally connected to said fore-part at a position adjacent said forward wall of the longitudinal mid-point of the last, said fore-part and heel-part being hollow, said heel-part having a thimble extending normal to the bottom thereof and open at the top thereof, said thimble being anchored to the top and bottom walls of said heel-part, and said hinge member being fixedly connected to said thimble.

8. The last of claim 7 wherein said hinge member is in thrust-transmitting contact with the interior of the bottom wall of said fore-part.

References Cited

UNITED STATES PATENTS

| | | | |
|---|---|---|---|
| 2,720,670 | 10/1955 | Clausing | 12—136 |
| 1,240,174 | 9/1917 | Brock | 12—136 |
| 1,558,269 | 10/1925 | Millay | 12—136 |
| 2,089,299 | 8/1937 | Ryan | 12—136 |
| 1,175,428 | 3/1916 | Freeman. | |
| 2,330,260 | 9/1943 | Baxter | 12—146 |
| 3,241,166 | 3/1966 | Jonas | 12—146 X |
| 3,315,290 | 4/1967 | Ishii | 12—146 |

FOREIGN PATENTS

| | | |
|---|---|---|
| 1,176,521 | 8/1964 | Germany. |

PATRICK D. LAWSON, Primary Examiner